(12) United States Patent
McNulty et al.

(10) Patent No.: US 6,692,679 B1
(45) Date of Patent: Feb. 17, 2004

(54) CROSS-LINKED MOLDED PLASTIC BEARINGS

(75) Inventors: Donald E. McNulty, Warsaw, IN (US); Todd Smith, Fort Wayne, IN (US)

(73) Assignee: DePuy Orthopaedics, Inc., Warsaw, IN (US)

( * ) Notice: Subject to any disclaimer, the term of this patent is extended or adjusted under 35 U.S.C. 154(b) by 489 days.

(21) Appl. No.: 09/328,080

(22) Filed: Jun. 8, 1999

Related U.S. Application Data

(60) Provisional application No. 60/088,729, filed on Jun. 10, 1998.

(51) Int. Cl.$^7$ .............................................. B29B 13/08
(52) U.S. Cl. ..................... 264/460; 522/184; 522/189; 522/911; 522/912; 525/333.7; 422/22; 422/23
(58) Field of Search ................................ 522/161, 184, 522/189, 911, 912, 157, 158; 528/503; 525/333.7; 422/22, 23

(56) References Cited

U.S. PATENT DOCUMENTS

| | | | |
|---|---|---|---|
| 2,878,174 A | * 3/1959 | Rainer et al. ............... | 522/161 |
| 2,904,480 A | * 9/1959 | Rainer et al. ............... | 522/161 |
| 2,906,678 A | * 9/1959 | Lawton et al. .............. | 522/161 |
| 2,919,473 A | * 1/1960 | Cole ......................... | 522/161 |
| 3,297,641 A | 1/1967 | Werber et al. | |
| 3,352,818 A | 11/1967 | Meyer et al. | |
| 3,629,998 A | * 12/1971 | Takehisa et al. ............ | 522/161 |
| 3,646,155 A | 2/1972 | Scott ......................... | 260/827 |
| 3,671,477 A | 6/1972 | Nesbitt ...................... | 524/424 |
| 3,758,273 A | 9/1973 | Johnston et al. | |
| 3,944,536 A | 3/1976 | Lupton et al. | |
| 4,138,300 A | * 2/1979 | Kaetsu et al. ............... | 522/161 |
| 4,138,382 A | 2/1979 | Polmanteer ................. | 523/113 |
| 4,390,666 A | 6/1983 | Moriguchi .................. | 525/194 |
| 4,483,333 A | 11/1984 | Wartman .................... | 128/90 |
| 4,518,552 A | 5/1985 | Matsuo et al ............... | 264/126 |
| 4,539,374 A | 9/1985 | Fenton et al. ............... | 525/240 |
| 4,582,656 A | 4/1986 | Hoffmann | |
| 4,655,769 A | 4/1987 | Zachariades | |
| 4,668,527 A | 5/1987 | Fujita et al. .................. | 427/35 |
| 4,743,493 A | 5/1988 | Sioshansi et al. | |
| 4,747,990 A | 5/1988 | Gaussens et al. | |
| 4,816,517 A | 3/1989 | Wilkus ....................... | 524/520 |
| 4,876,049 A | 10/1989 | Aoyama et al. | |
| 4,888,369 A | 12/1989 | Moore, Jr. .................. | 524/100 |
| 4,902,460 A | 2/1990 | Yagi ............................ | 264/83 |
| 4,944,974 A | 7/1990 | Zachariades | |
| 5,024,670 A | 6/1991 | Smith et al. | |
| 5,037,928 A | 8/1991 | Li et al. | |
| 5,130,376 A | 7/1992 | Shih .......................... | 525/240 |
| 5,133,757 A | 7/1992 | Sioshansi et al. ............ | 623/18 |
| 5,160,464 A | 11/1992 | Ward et al. | |
| 5,160,472 A | 11/1992 | Zachariades | |
| 5,180,394 A | 1/1993 | Davidson .................... | 623/18 |
| 5,192,323 A | 3/1993 | Shetty et al. ................ | 623/16 |
| 5,210,130 A | 5/1993 | Howard, Jr. | |
| 5,236,563 A | 8/1993 | Loh ........................... | 204/165 |
| 5,356,998 A | 10/1994 | Hobes | |
| 5,407,623 A | 4/1995 | Zachariades et al. | |
| 5,414,049 A | * 5/1995 | Sun et al. .................. | 525/333.7 |
| 5,449,745 A | 9/1995 | Sun et al. ................... | 528/483 |
| 5,466,530 A | 11/1995 | England et al. | |
| 5,478,906 A | 12/1995 | Howard, Jr. | |
| 5,480,683 A | 1/1996 | Chabrol et al. | |

(List continued on next page.)

FOREIGN PATENT DOCUMENTS

| | | |
|---|---|---|
| BE | 1001574 | 12/1989 |
| EP | 0 169 259 | 7/1984 |
| EP | 0 351 866 A2 | 1/1990 |
| EP | 0 373 800 A1 | 6/1990 |
| EP | 0722973 A1 | 7/1996 |
| EP | 0729981 A1 | 9/1996 |
| EP | 0 737481 A1 | 10/1996 |
| JP | 58-157830 A | 9/1983 |
| JP | 59-168050 | 9/1984 |
| JP | 62-243634 | 1/1987 |
| JP | 4-185651 | 7/1992 |
| JP | 4-198242 | 7/1992 |
| JP | 9-122222 | 5/1997 |
| WO | WO 93/10953 | 11/1991 |
| WO | WO 94/27651 | 12/1994 |
| WO | WO 95/21212 | 8/1995 |
| WO | WO 96/09330 | 3/1996 |
| WO | WO 97/29793 | 8/1997 |
| WO | WO 98/01085 | 1/1998 |
| WO | WO 98/14223 | 4/1998 |

OTHER PUBLICATIONS

D.C. Sun, C. Stark,, J.H. Dumbleton, "Development of an Accelerated Aging Method For Evaluation of Long–term Irradiation Effects on UHMWPE Implants", Polymer Preprints, vol. 35, No. 2, p. 969–970, 1994.

R.M. Streicher, "The Behavior of UHMWPE When Subjected to Sterilisation by Ionizing Radiation", In Ultra–High Molecular Weight Polyethylene as Biomaterial in Orthopedic Surgery, Toronto: Hogrefe & Huber Publishers, 1991, p. 66–73.

"Characterization of UHMWPE hip cups run on joint stimulators", P. Eyerer, M. Kurth, H.A. McKellop, and T. Mittlmeier, J. Biomedical Materials Research, vol. 21, 275–291 (1987).

(List continued on next page.)

Primary Examiner—Leo B. Tentoni
(74) Attorney, Agent, or Firm—Morrison & Foerster, LLP

(57) ABSTRACT

A method is provided for forming a plastic prosthesis bearing, net-shape bearing, near net-shape bearing or plastic stock from which such a bearing can be formed. The method includes the steps of providing plastic resin in powdered form, subjecting the powdered resin to irradiation to cross-link the resin, and molding the irradiated powder. The irradiated powder is molded by applying heat and pressure to form the powder into a desired solid plastic shape, the heating being sufficient to melt the powder.

50 Claims, No Drawings

U.S. PATENT DOCUMENTS

| | | | |
|---|---|---|---|
| 5,508,319 A | 4/1996 | DeNicola | 526/352 |
| 5,515,590 A | 5/1996 | Pienkowski | |
| 5,541,236 A * | 7/1996 | DeNicola et al. | 522/157 |
| 5,543,471 A | 8/1996 | Sun et al. | |
| 5,549,698 A | 8/1996 | Averill et al. | |
| 5,549,700 A | 8/1996 | Graham et al. | |
| 5,552,104 A * | 9/1996 | DeNicola, Jr. et al. | 264/456 |
| 5,577,368 A | 11/1996 | Hamilton et al. | |
| 5,593,719 A | 1/1997 | Deamaley et al. | 427/2.26 |
| 5,609,638 A | 3/1997 | Price et al. | 623/18 |
| 5,645,882 A | 7/1997 | Llanos | 427/2.24 |
| 5,650,485 A | 7/1997 | Sun et al. | |
| 5,674,293 A | 10/1997 | Armini et al. | 623/16 |
| 5,702,448 A | 12/1997 | Buechel et al. | 623/16 |
| 5,702,456 A | 12/1997 | Pienkowski | 623/18 |
| 5,728,748 A * | 3/1998 | Sun et al. | 522/65 |
| 5,876,453 A | 3/1999 | Beaty | 623/16 |
| 5,879,388 A | 3/1999 | Pienkowski et al. | 623/18 |
| 5,879,400 A * | 3/1999 | Merril et al. | 623/22 |
| 5,879,407 A | 3/1999 | Waggener | 623/22 |
| 5,883,151 A * | 3/1999 | Raetzsch et al. | 222/157 |
| 6,017,975 A * | 1/2000 | Saum et al. | 522/161 |

OTHER PUBLICATIONS

"Combined chemical and mechanical effects on free radicals in UHMWPE joints during implantation", M.S. Jahan, C. Wang, G. Schwartz, and J.A. Davidson, Journal of Biomedical Materials Research, vol. 25, pp. 1005–1017 (1991).

"Role of cyclic plastic deformation in the wear of UHMWPE acetabular cups", A. Wang, C. Start, J.H. Dumbleton, Journal of Biomedical Materials Research, vol. 29, 619–626 (1995).

"Radiation Sterilization and the Wear Rate of Polyethylene", R.M. Rose, E.V. Goldfarb, E. Ellis, and A.N. Crugnola, "Journal of Orthopaedic Research", Raven Press, New York ©1984, pp. 393–399.

Sun, Schmidig, Stark & Dumbleton: 21th Annual Meeting, Society for Biochemicals, Mar. 18–22, 1995 San Francisco, p. 362.

Bragdon, O'Connor, Muratoglu, Promnath, Merrill & Harris, "Advanced Mechanical Technology, Inc.", Watertown, MA 02172; 43rd Annual Meeting, Orthopedic Research Society, Feb. 9–13, 1997, San Francisco, California.

Premnath, Merrill, Jasty & Harris, "Melt Irradiated UHMWPE for Total Hip Replacements; Synthesis & Properties", Dept. of Chemical Eng., MIT Cambridge, MA 02319, 43rd Annual Meeting, Orthopedic Research Society, Feb. 9–13, 1997, San Francisco, California.

Bellare, Spector, Cohen & Thomas: 23rd Annual Meeting, Society of Biomaterials, Apr. 30–May 4, 1997, New Orleans, Louisiana, U.S.A., p. 75.

"Poly Two Carbon–Polyethylene Composite–A Carbon Fiber Reinforced Molded Ultra–High Molecular Weight Polyethylene", Technical Report, Zimmer (a Bristol–Myers Squibb Company), Warsaw (1977).

Atkinson, J.R. et al., "Silane cross–linked polyethylene for prosthetic applications. Part I. Certain physical and mechanical properties related to the nature of the material", *Biomaterials*, 4:267 (1983).

Atkinson, J.R. et al., "Silane cross–liked polyethylene for prosthetic applications. Part II. Creep and wear behavior and a preliminary moulding test", *Biomaterials*, 5:326 (1984).

Bartel, D.L. et al., "The Effect of Comformity, Thickness, and Material on Stresses In Ultra–High Molecular Weight Components for Total Hip Replacement", *J. Bone & Joint Surgery*, 68–A(7):1041 (1986).

Bhateja, S.K., "Radiation–Induced Crystallinity Changes In Pressure–Crystallized Ultra–High Molecular Weight Polyethylene", *J. Macromol. Sci. Phys.*, B22(1): 159 (1983).

Bhateja, S.K. et al., "Radiation–Induced Crystallinity Changes in Linear Polyethylene", *J. Polym. Sci. Polym. Phys. Ed.*, 21: 523 (1983).

Bhateja, S.K. et al., "Radiation–Induced Crystallinity Changes in Polyethylene Blends", *J. Mater. Sci.*, 20: 2839 (1985).

Birkinshaw, C. et al., "The Melting Behavior of Irradiated Polymers", *Thermochimica Acta*, 117: 365 (1987).

Bloebaum, R.D. et al., "Investigation of Early Surface Delamination Observed in Retrieved Heat–Pressed Tibial Inserts", *Clin. Orthop.*, 269: 120 (1991).

Bremmer, T. et al., "Peroxide Modification of Linear Low–Density Polyethylene: A Comparison of Dialkyl Peroxides", *J. Appl. Polym. Sci.*, 49 : 785 (1993).

Brown, K. J. et al., "The Wear of Ultra–High Molecular Weight Polyethylene with Reference to Its Use in Prostheses", *Plastics in Medicine & Surgery Plastics & Rubber Institute*, London, 2.1 (1975).

Chen, C.J. et al., "Radiation–Induced crosslinking: II. Effect on the crystalline and amorphous densitiies of polyethylene", *Coll. & Polym. Sci.*, 269: 469 (1991).

Chen, Y.L. et al., "Photocrosslinking of Polyethylene I. Photoinitiators, Crosslinking Agent, and Reaction Kinetics", *J. Polym. Sci., Part A: Polym. Chem.* 27: 4051 (1989).

Chen, Y.L. et al., "Photocrosslinking of Polyethylene. II. Properties of Photocrosslinked Polyethylene", *J. Polym. Sci., Part A; Polym. Chem.*, 27: 4077 (1989).

Connelly, G.M. et al., "Fatigue Crack Propagation Behavior of Ultrahigh Molecular Weight Polyethylene", *J. Orthop. Res.*, 2: 119 (1984).

deBoer, A.P. et al., "Polyethylene Networks Crosslinked in Solution: Preparation, Elastic Behavior, and Oriented Crystallization. I. Crosslinking In Solution", *J. Polym. Sci., Polym. Phys. Ed.*, 14: 187 (1976).

deBoer, J. et al., "Crosslinking of Ultra–High Molecular Weight Polyethylene in the Melt by Means of 2,5–dimethyl–2,5–bis (tert–butyldioxy)–3–hexyne", *Makromol. Chem. Rapid Commun.*, 2: 749 (1981).

deBoer, J. et al., "Crosslinking of Ultra–High Molecular Weight Polyethylene in the Melt by Means of 2,5–dimethyl–2,5–bis (tert–butyldioxy)–3–hexyne: 2. Crystallization Behavior and Mechanical Properties", *Polymer*, 23: 1944 (1982).

deBoer, J. et al., "Crosslinking of Ultra–High Molecular Weight Polyethylene in the Oriented State with Dicumylperoxide", *Polymer*, 25: 513 (1984).

Dijkstra, D.J. et al., "Cross–linking of ultra–high molecular weight polyethylene in the melt by means of electron bean irradiation", *Polymer*, 30: 866 (1989).

Ding Z.Y. et al., "Model Filled Polymers. VI. Determination of the Crosslink Density of Polymeric Beads by Swelling," *J. Polym. Sci., Part B: Poly. Phys.*, 29: 1035 (1991).

Eyerer, P. et al., "Property changes of UHMW polyethylene hip cup endoprostheses during implantation", *J. Biomed. Materials Res.*, 18: 1137 (1984).

Eyerer, P., "Polyethylene", *Concise Encyclopedia of Medical and Dental Implant Materials*, Pergamon Press, Oxford, 271 (1990).

Ferris, B.D., "A quantitiative study of the tissue reaction and its relationship to debris production from a joint implant", *J. Exp. Path.*, 71: 367 (1990).

Gielenz G. et al., "Crystalline and supermolecular structures in linear polyethylene irradiated with fast electrons", *Colloid & Polymer Sci.*, 260: 742 (1982).

Grobbelaar, C.J., et al., "The Radiation improvement of Polyethylene Prosthesis", *J. Bone & Joint Surgery*, 60–B(3): 370–374 (1978).

Grood, E.S. et al., "Analysis of retrieved implants: Crystallinity changes in ultrahigh molecular weight polyethylene", *J. Biomedical Materials Res.*, 16: 399 (1982).

Huang, D.D. et al., "Cyclic Fatigue Behaviors of UHMWPE and Enhanced UHMWPE", *Trans. 38$^{th}$ Ann. Mtg., Orthop. Res. Soc.*, 403 (1992).

Kamel, I. et al., "A Model for Radiation–Induced Changes in Ultrahigh–Molecular–Weight–Polyethylene", *J. Polym. Sci., Polym. Phys. Ed.*, 23:2407 (1985).

Kampouris, E.M. et al., "Benzyl Peroxide as a Crosslinking Agent for Polyethylene", *J. Appl. Polym. Sci.*, 34: 1209 (1987).

Kao, Y.H., "Crystallinity in chemically crosslinked low density polyethylenes: 1 Structural and fusion studies", *Polymer*, 27: 1669 (1986).

Katq, K. et al., "Structural Changes and Melting Behavior of γ–Irradiated Polyethylene", *Japanese J. Appl. Phys.*, 20: 691 (1981).

Kunert, K.A. et al., "Structural investigation of chemically crosslinked low density polyethylene", *Polymer*, 22: 1355 (1981).

Kurth, M. et al., "Effects of Radiation Sterilization on UHMW–Polyethylene", *Trans. Third World Biomaterials Congress*, 589 (1988).

Landy, M.M. et al., "Wear of Ultra–high–molecular–weight Polyethylene Components of 90 Retrieved Knee Prostheses", *J. Arthroplasty*, Supplement, 3: S73 (1988).

Lem, K. et al., "Rheological Properties of Polyethylenes Modified with Dicumyl Peroxide", *J. Appl. Polym. Sci.*, 27: 1367 (1982).

Li, S. et al., "Characterization and Description of an Enhanced Ultra High Molecular Weight Polyethylene for Orthopaedic Bearing Surfaces", *Trans. 16$^{th}$ Ann. Soc. Biomaterials Meeting*, Charleston, SC, 190 (1990).

Manley, T.R. et al., "The effects of varying peroxide concentration in crosslinked linear polyethylene", *Polymer*, 12:176 (1971).

McKellop, H. et al., "Friction, Lubrication and Wear of Polyethylene Metal and Polyethylene/Ceramic Hip Prostheses on a Joint Simulator", *Fourth World Biomaterials Congress*, Berlin, Apr., 118 (1992).

Minkova, L., "DSC of γ–irradiated ultra–high molecular weight polyethylene and high density polyethylene of normal molecular weight", *Colloid & Polymer Sci.*, 266: 6 (1988).

Minkova, L. et al., "Blends of normal high density and ultra–high molecular weight polyethylene, γ–irradiated at a low dose", *Colloid & Polymer Sci.*, 268: 1018 (1990).

Nagy, E.V. et al., "A Fourier transform infrared technique for the evaluation of polyethylene orthopaedic bearing materials", *Trans. 16$^{th}$ Ann. Soc. For Biomaterials Meeting*, Charleston, SC 109 (1990).

Narkis, M. et al., "Structure and Tensile Behavior of Irradiation–and Peroxide–Crosslinked Polyethylene", *J. Macromol. Sci.–Phys.*, B26(1): 37 (1987).

Nusbaum, H. J. et al., "The Effects of Radiation Sterilization on the Properties of Ultrahigh Molecular Weight Polyethylene", *J. Biomed. Materials Res.*, 13: 557 (1979).

Oonishi, H. et al., "Improvement of Polyethylene by Irradiation in Artificial Joints", *Radiat, Phys. Chem.*, 39: 495 (1992).

Oonishi, H. et al., "In Vivo and In Vitro Wear Behavior on Weightbearing Surfaces of Polyethylene Sockets Improved by Irradiation in Total Hip Prostheses", *Surface Modification Technologies V*, 101–115 (1992), Sudarsahn T.S. et al., ed. The Institute of Materials.

Painter, P.C., et al., "The Theory of Vibrational Spectroscopy and its Application to Polymeric Materials", Ed. John Wiley & Sons, New York, U.S.A., (1982).

Paul, J. P., "Forces Transmitted by Joints in the Human Body", *Proc. Instn. Mech. Engrs.* 181, Part 3J, Paper 8 (1966).

Qu, B.J. et al., "Photocross–linking of Low Density Polyethylene. I Kinetics and Reaction Parameters", *J. Appl. Polym. Sci.*, 48: 701 (1993).

Qu, B.J. et al., "Photocross–linking of Low Density Polyethylene. II Structure and Morphology", *J. Appl. Polym. Sci.*, 48: 711 (1993).

Rimnac, C.M. et al., "Chemical and Mechanical Degradation of UHMWPE: Report of the Development of an In vitro Test", *J. Appl. Biomaterials*, 5:17 (1994).

Rimnac, C.M. et al., "Observations of Surface Damage and Degradation on Retrieved PCA Knee Implants", *Trans. 38$^{th}$ Ann. Orthopaedic Res. Society*, Washington, D.C., 330 (1992).

Roe, R. et al., "Effect of radiation sterilization and aging on ultrahigh molecular weight polyethylene", *J. Biomed. Mat. Res.*, 15: 209 (1981).

Rose, R.M. et al., "On the True Wear Rate of Ultra–High Molecular Weight Polyethylene in the Total Hip Prosthesis", *J. Bone & Joint Surgery*, 62A(4): 537(1980).

Rose, R.M. et al., "Exploratory Investigations in the Structure Dependence of the Wear Resistance of Polyethylene", *Wear*, 77:89 (1982).

Rostoker, W. et al., "The Appearances of Wear on Polyethylene–A Comparison of in vivo and in vitro Wear Surfaces", *J. Biomed. Materials Res.*, 12:317 (1978).

Seedhom, B.B. et al., "Wear of Solid Phase Formed High Density Polyethylene in Relation to the Life of Artificial Hips and Knees", *Wear*, 24: 35 (1973).

Shen, C. et al., "The Friction and Wear Behavior of Irradiated Very High Molecular Weight Polyethylene", *Wear*, 30:349 (1974).

Shinde, A. et al., "Irradiation of Ultrahigh–Molecular–Weight Polyethylene", *J. Polym. Sci., Polym. Phys. Ed.*, 23: 1681 (1985).

Spruiell, J.E. et al., "Methods of Experimental Physics", L. Marton & C. Marton, Eds., vol. 16, Part B Academic Press, New York (1980).

Streicher, R.M., "Ionizing irradiation for sterilization and modification of high molecular weight polyethylenes", *Plastics & Rubber Processing & Applications*, 10: 221 (1988).

Streicher, R.M., "Investigation on Sterilization and Modification of High Molecular Weight Polyethylenes by Ionizing Irradiation", *Beta–gamma*, 1/89:34–43.

Swanson, S.A.V. et al., "Chapter 3, Friction, Lubrication and Wear", *The Scientific Basis of Joint Replacement*, Pittman Medical Publishing Co., Ltd. (1977).

Wang, X. et al., "Melting of Ultrahigh Molecular Weight Polyethylene", *J. App. Polymer Sci.*, 34:593 (1987).

Wright, T.M. et al., "The effect of carbon fiber reinforcement on contact area, contact pressure, and time–dependent deformation in polyethylene tibial components", *J. Biomed. Materials Res.*, 15:719 (1981).

Zachariades, A.E., "A New Class of UHMWPE Orthopaedic Prosthetic Devices with Enhanced Mechanical Properties", *Trans. Fourth World Biomaterials Congress*, Berlin 623 (1992).

Zhao, Y. et al., "Effect of Irradiation on Crystallinity and Mechanical Properties of Ultrahigh Molecular Weight Polyethylene", *J. Appl. Polym. Sci.*, 50:1797 (1993).

"News You Can Use", vol. II, No. 2 (May 1996).

"For the Tough Jobs: 1900 UHMW Polymer", Himont, Inc. (1988).

"Technical Information: 1900 Ultrahigh Molecular Weight Polymer, General Information and Applications", *Bulletin JPE–101A*, Hercules, U.S.A., Inc., (1989).

"Technical Information: 1900 Ultrahigh Molecular Weight Polymer, Nuclear Radiation Effects", *Bulletin HPE–111*, Himont U.S.A., Inc. (1985).

"Technical Information: 1900 Ultrahigh Molecular Weight Polymer, Effect of Polymer Modification", *Bulletin HPE–116*, Himont U.S.A., Inc. (1987).

"Ultra–High Molecular Weight Polyethylene as Biomaterial In Orthopaedic Surgery", Hogrefe & Huber Publishers.

Appleby, R.W. et al., "Post–gamma irradiation cross–linking of polyethylene tape by acetylene treatment", *J. Material Sci.*, 29: 227–231 (1994).

Higgins, J.C. et al., "Evaluation of Free Radical Reduction Treatments for UHMWPE", *Proceedings of the 42$^{nd}$ Annual Mtg., Orthopaedic Res. Soc.*, Feb. 19–22:485(1996).

Jasty, M. et al., "Marked Improvement in the Wear Resistance of a New Form of UHMPWE in a Physiologic Hip Simulator", *Trans. 43$^{rd}$ Ann. Mtg., Orthopaedic Research Soc.*, San Francisco, CA, Feb. 9–13:785(1997).

Jasty, M. et al., "Marked Improvement in the Wear Resistance of a New Form of UHMPWE in a Physiologic Hip Simulator", *Trans. Soc. Biomaterials*, vol. XX, p 71, 23$^{rd}$ *Ann. Mtg. Soc. for Biomaterials*. New Orleans, Louisana, U.S.A., Apr. 30–May 4:157 (1997).

Streicher, Influence of Ionizing Irradiation in Air and Nitrogen for Sterilization of Surgical Grade Polyethylene for Implants, *Radiat. Phys. Chem.*, vol. 31, Nos. 4–6: 693–698 (1988).

Pleiss et al., "The Improvement of Polyethylene Prostheses Through Radiation Crosslinking", *Radiat.. Phys. Chem.*, 9: 647–652 (1977).

Streicher, "The Behavior of UHMW–PE when Subjected to Sterilization by Ionizing Radiation", Ultra–High Molecular Weight Polyethylene as Biomaterial in Orthopedic Surgery, 66–73 (1990).

Saunders, C. et al., "Radiation Effects on Microorganisms and Polymers for Medical Products", *Medical Device & Diagnostic Industry*, 222:89–22 (1993).

Kang et al., "The Radiation Chemistry of Polyethylene IX. Temperature Coefficient of Cross–linking and Other Effects", *J. Amer. Chem. Society*, 89(9): 1980–1986 (1967).

Rose et al., "Radiation Sterilization and the Wear Rate of Polyethylene", *J. Orthopaedic Res. Society*, 2(4): 393–400 (1984).

Oonishi, H. et al., "Super Low Wear Cross–Linked UHM-WPE by Heavy High–Dose Gamma Radiation", *WPOA 2$^{nd}$ Congress of Hip Section*, 61 (1996).

Jahan et al., "Combined chemical and mechanical effects on free radicals in UHMWPE joints during implantation", *J. Biomed. Material Res.*, 25: 1005–1016 (1991).

"Standard Practice for Dosimetry in an Electron Bean Facility for Radiation Processing at Energies Between 300 keV and 25 keV", *Am. Soc. for Testing & Materials*, Designation: E1649–94, 870–888 (1995).

Oonishi, H. et al., "The Low Wear of Cross–Linked Polyethylene Socket in Total Hip Prostheses", Encyclopedic Handbook of Biomaterials & Bioengineering, vol. 2, Marcel Dekker, Inc., 1853–1868 (1995).

Atkinson, J. et al., "The nature or silane cross–linked HDPE is discussed. Creep and wear tests indicate its potential as a possible replacement for high molecular weight polyethylene in prostheses", *Polymers in Medicine and Surgery, Conf. Held by Plastics and Rubber Institute and Biological Engineering Soc.*, UK. Sep, P4/1–P4/9 (1986).

Jones, W. et al., Effect of γ Irradiation on the Friction and Wear of Ultrahigh Molecular Weight Polyethylene, *Wear* 70: 77–92 (1981).

Gent, A. et al., "Elastic Behavior, Birefringence, and Swelling of Amorphous Polyethylene Networks", *J. Polymer Sci.* 5: 47–60 (1967).

Zoepfl, F. et al., "Differential Scanning Calorimetry Studies of Irradiated Polyethylene: I. Melting Temperatures and Fusion Endotherms", *J. Polymer Sci. Polym. Chem. Ed.*, 22: 2017–2032 (1984).

Zoepfl, F. et al., "Differential Scanning Calorimetry Studies of Irradiated Polyethylene: II. The Effect of Oxygen", *J. Polymer Sci. Polym. Chem. Ed.*, 22: 2032–2045 (1984).

Mandelkern, L. et al., "Fusion of Polymer Networks Formed from Linear Polyethylene: Effect of Intermolecular Order", contribution from the General Electric Research Laboratory and from the Polymer Structure Section, National Bureau of Standards 82: 46–53 (1960).

Muratoglu, O.K. et al., "A Comparison of 5 Different Types of Highly Crosslinked UHMWPES: Physical Properties and Wear Behavior", *45$^{th}$ Annual Meeting, Orthopaedic Research Society*, Anaheim, CA, Feb. 1–4, 77 (1999).

Muratoglu, O.K. et al., "A Novel Method of Crosslinking UHMWPE to Improve Wear With Little or No Sacrifice on Mechanical Properties", *45$^{th}$ Annual Meeting, Orthopaedic Research Society*, Anaheim, CA, Feb. 1–4, 829 (1999).

Muratoglu, O.K. et al., "Electron Beam Cross Linking of UHMWPE At Room Remperature, A Candidate Bearing Material for Total Joint Arthroplasty", *23rd Annual Meeting of the Society for Biomaterials*, New Orleans, Louisana, Apr. 30–May 4, 74 (1997).

Matsubara, K et al., "The Wear Properties of High–Density Polyethylene Irradiated by Gamma Rays", *Wear* 10: 214 (1967).

McKellop, H. et al., "Increased Wear of UHMW Polyethylene After Gamma Radiation Sterilization", *Trans. 26$^{th}$ Ann. ORS*, Atlanta, Georgia, Feb. 5–7 (1980).

McKellop, H., "The Effect of Radiation and Ethylene Oxide Sterilization on the Wear of UHMW Polyethylene", *7$^{th}$ European Conference on Biomaterials*, Sep. 8–11, (1987).

Shen, F–S. et al., "Irradiation of Chemically Crosslinked Ultrahigh Molecular Weight Polyethylene", *J. Polymer Sci.: Part B: Polymer Phys.* 34: 1063–1077 (1996).

Oka, M. et al., "Wear–Resistant Properties of Newly Improved UHMWPE", *Trans. Fifth World Biomaterials Congress*, Toronto, Canada 520, (May 29–Jun. 2, 1996).

Bellare, A. et al., "Deformation, Morphology and Wear Behavior of Polyethylene", *Trans. $23^{rd}$ Ann. Mtg., Soc. Biomaterials*, New Orleans, Louisiana, 75 (Apr. 30–May 4, 1997).

Clarke, I.C. et al., "Simulator Wear Study of High–Dose Gamma–Irradiated UHMWPE Cups", *Trans. $23^{rd}$ Ann. Mtg., Soc. Biomaterials*, New Orleans, LA, 71, (Apr. 30–May 4, 1997).

Taylor, G. et al., "Stability of $N_2$ Packaged Gamma Irradiated UHMWPE", *Trans. $23^{rd}$ Ann. Mtg., Soc. Biomaterials*, New Orleans, LA, 421, (Apr. 30–May 4, 1997).

McKellop, H. et al., "The Effect of Sterilization Method, Calcium Stearate and Molecular Weight on Wear of UHMWPE Acetabular Cups", *Trans. $23^{rd}$ Ann. Mtg., Soc. Biomaterials*, New Orleans, LA, 43 (Apr. 30–May 4, 1997).

McKellop, H. et al., "Effect of Sterilization Method on the Wear Rate of UHMW Polyethylene Acetabular Cups in a Hip Simulator", *Trans. $43^{rd}$ Ann. Mtg., Orthopaedic Res. Soc.* San Francisco, CA, 7, 94–16 Feb. 9–13 (1997).

McKellop, H. et al., "Wear of UHMWPE Acetabular Cups After Gamma Sterilization in Nitrogen, Thermal Stabilization and Artificial Aging", *Trans. $23^{rd}$ Ann. Mtg., Soc. Biomaterials*, New Orleans, LA, Apr. 30–May 4, 45 (1997).

Wang, A. et al., "Effect of Radiation Dosage on the Wear of Stabilized UHMWPE Evaluated by Hip and Knee Joint Simulators", *Trans. $23^{rd}$ Ann. Mtg., Soc. Biomaterials*, New Orleans, LA, 394 (Apr. 30–May 4, 1997).

Wang, A. et al., "Wear Mechanisms and Wear Testing of Ultra–High Molecular Weight Polyethylene in Total Joint Replacements", Hand–Out for Polyethylene Wear in Orthopaedic Implants Workshop, *Trans. $23^{rd}$ Ann. Mtg., Soc. Biomaterials*, New Orleans, LA (Apr. 30–May 4, 1997).

Yu, Y.J. et al., "Oxidation of UHMWPE Acetabular Cups After Sterilization and Wear Testing in a Hip Joint Simulator", *Trans. $43^{rd}$ Ann. Mtg., Orthopaedic Res. Soc.* San Francisco, CA, 778 (Feb. 9–13, 1997).

Roe, R. et al., "Effect of Radiation Sterilization and Aging on Ultrahigh Molecular Weight Polyethylene", *Journal of Biomedical Materials Research*, 15:209–230 (1981).

Li, S. et al., "Chemical Degradation of Polyethylene in Hip and Knee Replacements", *$38^{th}$ Ann. Mtg., Orthopaedic Research Society*, Washington, D.C., 41, (Feb. 7–20, 1992).

Kurtz, S.M. et al., "Post–Irradiation Aging and The Stresses in UHMWPE Components for Total Joint Replacement", *$40^{th}$ Ann. Mtg., Orthopaedic Research Society*, New Orleans, LA, 584, (Feb. 21–24, 1994).

Lancaster et al., "Friction and Wear", in Jenkins (ed): Polymer Science, 959, 1045, North Holland Publishing Company (1972).

McKellop, H. et al., "Accelerated Aging of Irradiated UHMW Polyethylene for Wear Evaluations", *$42^{nd}$ Annual Meeting, Orthopaedic Research Society*, Atlanta, Georgia, 483, (Feb. 19–22, 1996).

Blunn, G.W. et al., "The Effect of Oxidation on the Wear of Untreated and Stabilized UHMWPE", *$42^{nd}$ Annual Meeting, Orthopaedic Research Society*, Atlanta, Georgia, 482, (Feb. 19–22, 1996).

"Duration ™ Stabilized UHMWPE: an UHMWPE with Superior Wear and Oxidation Resistance; Technical Development and Scientific Evaluation", (Cover sheet and reference page).

Sun, D.C. et al.,"The Origin of the White Band Observed in Direct Compression Molded UHMWPE Inserts", *$20^{th}$ Annual Meeting Society for Biomaterials*, 121 (Apr. 5–9, 1994).

Sun, D.C. et al., "On the Origins of a Subsurface Oxidation Maximum and its Relationship to the Performance of UHMWPE Implants", *$21^{st}$ Annual Meeting, Society for Biochemicals*, San Francisco, CA, 362: (Mar. 18–22, 1995).

Premnath, V. et al., "Melt Irradiated UHMWPE for Total Hip Replacement: Synthesis & Properties", *$43^{rd}$ Annual Meeting, Orthopedic Res. Soc.*, San Francisco, CA, 91–16, (Feb. 9–13, 1997).

Muratoglu, O.K. et al., "The Effect of Temperature on Radiation Crosslinking of UHMWPE for Use in Total Hip Arthroplasty", *$46^{th}$ Annual Meeting, Orthopaedic Res. Soc.*, Orlando, FL, 0547 (Mar. 12–15, 2000).

* cited by examiner

CROSS-LINKED MOLDED PLASTIC BEARINGS

This application claims priority under 35 U.S.C. §119(e) of Ser. No. 60/088,729 filed Jun. 10, 1998 in the United States Patent and Trademark Office.

BACKGROUND OF THE INVENTION

The present invention relates to improved bearings for use in orthopaedic implant prostheses and particularly to methods for making cross-linked molded ultra high molecular weight polyethylene (UHMWPE) bearings and bearing material.

Such UHMWPE resin is commonly used for bearings in hip, knee, shoulder and elbow prosthesis. Typically, the bearings may be formed by direct compression molding processes or by machining the required bearing shapes from mill shapes such as sheet or bar stock material. Typically, the stock material or the molded bearings are irradiated and subsequently heat treated or heat annealed. The irradiation generates molecular cross-links and free radicals. The free radicals are subsequently eliminated by the heat treating processes.

Reference is made to a number of prior art references as follows:

U.S. Patents:
1. U.S. Pat. No. 5,414,049, Non-Oxidizing Polymeric Medical Implant, to Deh-Chuan Sun, et al.
2. U.S. Pat. No. 5,449,745, Non-Oxidizing Polymeric Medical Implant, to Deh-Chuan Sun, et al.
3. U.S. Pat. No. 5,543,471, Non-Oxidizing Polymeric Medical Implant, to Deh-Chuan Sun, et al.
4. U.S. Pat. No. 5,650,485, Non-Oxidizing Polymeric Medical Implant, to Deh-Chuan Sun, et al.
5. U.S. Pat. No. 5,728,748, Non-Oxidizing Polymeric Medical Implant, to Deh-Chuan Sun, et al.
6. U.S. Pat. No. 4,586,995, Polymer and Irradiation Treatment Method, to James C. Randall.
7. U.S. Pat. No. 5,153,039, High Density Polyethylene Article with Oxygen Barrier Properties, to Jay P. Porter, et al.
8. U.S. Pat. No. 5,508,319, High Melt Strength, Ethylene Polymer, Process for Making It, and Use Thereof, to Anthony J. DeNicola, Jr. et al.
9. U.S. Pat. No. 3,352,818, Stability of Polyolefines, to Gerhard Meyer, et al.
10. U.S. Pat. No. 5,577,368, Method for Improving Wear Resistance of Polymeric Bioimplantable Components, to John V. Hamilton, et al.
11. U.S. Pat. No. 5,753,182, Method for Reducing the Number of Free Radicals Present in Ultrahigh Molecular Weight Polyethylene Orthopedic Components, to Joel Higgins.
12. U.S. Pat. No. 5,709,020, Method for Reducing the Generation of Wear Particulates From an Implant, to David A. Pienowski, et al.
13. U.S. Pat. No. 5,702,456, Implant Having Reduced Generation of Wear Particulates, to David A. Pienowski.
14. U.S. Pat. No. 5,515,590, Method for Reducing the Generation of Wear Particulates From an Implant, David A. Pienowski.
15. U.S. Pat. No. 5,593,719, Treatments to Reduce Frictional Wear Between Components Made of Ultra-High Molecular Weight Polyethylene and Metal Alloys, Geoffrey Dearnaley, et al.
16. U.S. Pat. No. 4,366,618, Bone Connective Prosthesis Adapted to Maximize Strength and Durability of Prostheses —Bone Cement Interface, and Methods of Forming Same, to Simon Raab.
17. U.S. Pat. No. 5,014,494, Method of Sterilizing Medical Articles, to Robert D. George.
18. U.S. Pat. No. 5,137,688, Irradiated Articles Molded From Polycarbonate—Polyamide Blends, to James L. DeRudder.
19. U.S. application Ser. No. 08/911,792, Process for Medical Implant of Cross-linked Ultrahigh Molecular Weight Polyethylene Having Improved Balance of Wear Properties and Oxidation, filed Aug. 15, 1997, to Kenneth Ashley Saum, et al.

Foreign Patents
20. E.P. Patent No. 0722973 A1, Chemically Crosslinked Ultrahigh Molecular Weight Polyethylene for Artificial Human Joints, to Ron Salovey, et al.
21. W.O. Patent No. 97/29793, Radiation and Melt Treated Ultra High Molecular Weight Polyethylene Prosthetic Devices, to W. Merrill, et al.
22. W.O. Patent No. 98/01085, Crosslinking of Polyethylene for Low Wear Using Radiation and Thermal Treatments, to Fu-Wen Shen, et al.

The above references teach the general concepts involved in forming UHMWPE resin directly into a part or a stock form from which the part is made, gamma or other irradiation of the part or the stock form and subsequent heat treating (annealing or remelting) of the part or stock form. The disclosures of these above-listed references are incorporated herein for purposes of establishing the nature of UHMWPE resin, the irradiation steps and options and the heat treating steps and options.

SUMMARY OF THE INVENTION

The present invention is directed to a method for irradiating the UHMWPE resin when it is in powder form, which produces cross linking of the molecular chains as well as free radicals. The free radicals generated from the gamma irradiation are quenched by the subsequent molding process.

While the prior art teaches irradiating formed bearing parts or stock from which bearings are made, the present invention involves irradiation of the UHMWPE resin powder, preferably by gamma or electron beam irradiation. This ionizing irradiation will generate molecular cross-links and free radicals as is well documented. These free radicals will be dealt with in the present invention by the molding process which involves temperatures above the melting point of the polymer.

The present invention is designed to reduce the amount of wear debris generated from UHMWPE bearings. Such wear debris has been associated with bone and soft tissue deterioration leading to implant loosening, which may necessitate even revision surgery. The present invention is also to improve the wear resistance of UHMWPE bearings.

Additional features of the present invention will become apparent to those skilled in the art upon consideration of the following detailed description of preferred embodiments exemplifying the best mode of carrying out the invention as presently perceived.

DESCRIPTION OF THE PREFERRED EMBODIMENT(S)

The present invention involves producing a cross-linked bearing component by cross-linking the UHMWPE resin powder and then using the thermal energy of the molding process to promote further cross-linking by free-radical quenching. The process of the present invention may be used to mold net-shape bearings directly to provide a finish which is satisfactory for an articular (bearing) surface. (The term "net-shape" is intended to define a shape that is the final shape of the bearing to be used in the implant. "Near net-shape" requires some degree of machining to produce the final bearing.) It is believed that smoother bearing surfaces can be made by molding processes than by machining processes.

The irradiation process may preferably be performed under vacuum, in an inert atmosphere to eliminate oxygen, or in an oxygen reduced atmosphere. Oxygen present when irradiating has been shown to cause subsequent reduction in mechanical properties for UHMWPE. A premolding vacuum phase is also contemplated by the present invention to enhance removal or reduction of any unwanted oxygen from the UHMWPE resin powder. For example, the irradiated powder resin may be cold pressed into the desired shape and then left under vacuum before heat is applied.

The molding process, which may also preferably be performed under vacuum, may involve pressures from 1,000 to 70,000 psi and set point temperatures of 250° to 500° Fahrenheit. The resulting work piece is either the actual desired bearing configuration or blank that can be machined subsequently to produce the desired bearing geometry.

It will be appreciated, however, that acceptable results may be achieved when either or both the irradiation process and the molding process are carried out under atmospheric conditions, i.e., with some oxygen present. This may well be the case for certain bearing configurations.

One embodiment of the present invention relates to a method for producing a medical implant or stock from which an implant can be made from olefinic material such as UHMWPE comprising the steps of placing olefinic resin in a sealed container, preferably evacuating or displacing air from the container to produce a low oxygen or oxygen free atmosphere, subjecting the resin container to irradiation, preferably gamma or electron beam irradiation, at a dose level between 2 and 50 Mrads to create cross-links and free radicals within the polymer resin, preferably maintaining an inert atmosphere, and subjecting the free radical containing powder to a molding operation which preferably takes place in a vacuum or in the inert atmosphere. The irradiated resin may preferably be transferred from the sealed container to the molding equipment in a vacuum or in an inert atmosphere environment or may be exposed to air for a short time during the transfer.

The molding operation may comprise the steps of raising the powder resin within the mold to a temperature at or above the melting point of the resin. The purpose of this is to produce a consolidated net-shape or near net-shape implant or raw material (bar, sheet or puck stock) while simultaneously quenching the free radicals to promote further cross-linking between molecules of the polymer.

The sealed container may be flushed with inert gas (nitrogen, argon, helium, neon, or any combination thereof) and evacuated several times to further reduce the residual oxygen content. Instead of a vacuum, the atmosphere of the scaled container prior to gamma irradiation and storage may also be an inert gas consisting of nitrogen, argon, helium, neon, or any combination thereof.

A more complete understanding of the present invention can be obtained by referring to the following illustrative examples of the practice of the invention, which examples are not intended, however, to be unduly limitative of the invention.

EXAMPLE 1

A polymer resin is acquired in powder form, which is often referred to as "flake" in the industry. This resin powder is placed in pouches which are formed from a breathable plastic membrane. It is common to use such Tyvek™ pouches to package medical products for sterilization. A plurality of such pouches are placed in a vacuum container, i.e., a container which can be closed and in which a vacuum can be formed. This container may be pumped for a period of time sufficient to remove the oxygen, at least to the extent discussed in the prior art references. In some cases, it ay be advisable to pull what is referred to as a "high vacuum" condition within the sealed container to make sure the resin powder is oxygen free. It will be appreciated that the process of pumping the vacuum in the container may be a process in which, after a vacuum is initially pulled on the container, the container may be filled with an inert gas, and then the inert gas may be pumped from the container. This flushing process may take place two or more times to acquire the desired oxygen free condition.

The container is sealed and left under a vacuum and irradiated using standard irradiation techniques through the walls of the metal container. While the irradiation may be from 2 to 50 Mrads or even 2 to 100 Mrads, it is generally believed that irradiation from 2 to 20 Mrads is sufficient. The container is removed from the irradiation station and a two day post-irradiation pump down was conducted to remove residual hydrogen. The container was then brought to the molding area which may comprise one or more molding presses. It may be advisable to transfer the pouches from the container to the molding presses using a system which will keep the pouches and the powder therein from being exposed to oxygen. It is believed to be preferable to do the actual molding in mold equipment which is capable of being under a vacuum. Alternatively, a short time exposure of the irradiated resin to air may be inconsequential. Essentially, the resin powder is transferred from the pouches into the molding equipment and molded under a vacuum or inert gas (oxygen free environment). The molding operation is rather conventional in that it applies temperatures greater than the melting point of the resin and pressures to form the desired molded material which may be a net-shape bearing, a near net-shape bearing or stock from which a bearing may be fabricated.

The method of the present invention, therefore, contemplates irradiation of resin powder and molding (remelting) of the resin powder under sufficient heat and pressure to form the powder into a desired solid plastic shape. The irradiation and the molding may take place in atmosphere or in a vacuum or in an inert atmosphere. In this specification and in the claims, a vacuum, partial vacuum or inert atmosphere may collectively be referred to as an "oxygen reduced atmosphere." The molding may take place in conventional molding equipment in atmosphere or in oxygen reduced atmosphere. The plastic may be an olefinic resin such as UHMWPE or any plastic which is cross-linked by irradiation and the free radicals of which are eliminated by heat treating such as by remelting for molding.

EXAMPLE 2

A UHMWPE polymer resin (GUR 1050 from Ticona) was acquired in powder form. This resin powder was placed in a pouch and positioned in a vacuum container, which was closed. The container was placed under a vacuum for a period of time sufficient to substantially remove the oxygen from the resin powder. The container was left under a vacuum and irradiated at about 5 to about 10 Mrads using standard irradiation techniques.

The polymer resin was then removed from the container and subjected to a two day post-irradiation pump down to remove residual hydrogen from the polymer resin. The polymer resin was then transferred to compression molding equipment. The polymer resin was again placed under a vacuum to substantially remove the oxygen from the resin powder and molded in an oxygen free environment. About 1500 pounds per square inch of pressure was applied to the resin power at a temperature of about 400° F. for 60 minutes. The polymer resin was allowed to cool to room temperature and removed from the molding equipment.

It is thought that the method for forming a plastic prosthesis bearing, net-shape bearing, near net-shape bearing or plastic stock from which such a bearing can be formed by the present invention and many of its attendant advantages will be understood from the foregoing description and it will be apparent that various changes may be made without departing from the spirit and scope of the invention or sacrificing all of its material advantages, the form hereinbefore described being merely a preferred or exemplary embodiment thereof.

What is claimed is:

1. A method for forming a plastic prosthesis bearing, net-shape bearing, near net-shape bearing or plastic stock from which such a bearing can be formed, the method comprising the steps of providing plastic resin in powdered form, subjecting the powdered resin to irradiation to cross-link the resin, and molding the irradiated powder by applying heat and pressure to form the powder into a desired solid plastic shape, the heating being sufficient to melt the powder.

2. The method of claim 1 in which the irradiation step is accomplished in an oxygen reduced atmosphere.

3. The method of claim 1 in which the molding step is accomplished in an oxygen reduced atmosphere.

4. The method of claim 1 in which the molding step involves pressure from 1,000 to 70,000 psi.

5. The method of claim 1 in which the molding step is at a temperature of 250° to 500° F.

6. The method of claim 1 in which the irradiation step is at a level of 2 to 100 Mrads gamma radiation.

7. The method of claim 1 in which the irradiation step is at a level of 2 to 5 Mrads of gamma radiation.

8. The method of claim 1 in which the irradiation step is at a level of 2 to 20 Mrads of gamma radiation.

9. The method of claim 1 in which the irradiation step comprises the steps of placing resin powder in pouches formed from a breathable plastic membrane, placing the pouches in a container, and providing an oxygen reduced atmosphere in the container during the irradiation.

10. The method of claim 9 in which the molding step involves transferring the pouches containing the irradiated resin to the molding press where the heat and pressure are applied.

11. The method of claim 10 in which the molding step involves a temperature greater than the melting point of the resin.

12. The method of claim 1 in which the plastic is an olefinic plastic resin.

13. The method of claim 1 in which the plastic is UHMWPE.

14. A method for forming a plastic prosthesis bearing, net-shape bearing, near net-shape bearing or plastic stock from which such a bearing can be formed, the method comprising the steps of providing plastic resin in powdered form, subjecting the powdered resin to irradiation to cross-link the resin, heating the powder resin within a mold to a temperature at or above the melting point of the resin for a time sufficient to form the powder into a desired solid plastic shape and quench the free radicals.

15. The method of claim 14 in which the irradiation step is accomplished in an oxygen reduced atmosphere.

16. The method of claim 14 in which the heating step is an accomplished in an oxygen reduced atmosphere.

17. The method of claim 14 in which the heating step involves pressure from 1,000 to 70,000 psi.

18. The method of claim 14 in which the heating step is at a temperature of 250° F. to 500° F.

19. The method of claim 18 in which the irradiation step is at a level of 2 to 100 Mrads gamma radiation.

20. The method of claim 14 in which the irradiation step is at a level of 2 to 5 Mrads of gamma radiation.

21. A method of manufacturing an articulating bearing surface for use in an orthopaedic implant comprising:

providing a supply of ultra-high molecular weight polyethylene particles;

irradiating said particles with sufficient radiation energy to crosslink at least a portion of said ultra-high molecular weight polyethylene; and forming said irradiated particles into the articulating bearing surface.

22. The method of claim 21, wherein said forming comprises:

placing said irradiated particles into a mold;

pressing said irradiated particles within said mold; and heating said particles within said mold.

23. The method of claim 22, wherein said mold is heated above the melting point of said ultra-high molecular weight polyethylene.

24. The method of claim 22, wherein said mold comprises a compression mold.

25. The method of claim 21, wherein said particles comprise at least one of powder and flakes.

26. The method of claim 21, wherein said supply of particles comprises packets and said irradiating comprises irradiating said particles within said packets.

27. The method of claim 26, wherein said supply of particles is formed by placing said packets of particles in a mold and pressing and heating the packet and particles within the mold.

28. The method of claim 21, wherein said irradiating comprises irradiating said particles with sufficient radiation energy to crosslink substantially all of said ultra-high molecular weight polyethylene.

29. The method of claim 21, further comprising reducing an amount of oxygen in an ambient atmosphere around said particles during said irradiating.

30. The method of claim 29, wherein said reducing the amount of oxygen within said reforming apparatus comprise subjecting said particles to an inert gas or creating a vacuum or partial vacuum around said particles during said irradiating.

31. The method of claim 21, wherein said radiation energy is gamma rays or electron beam radiation.

32. The method of claim 21, wherein said articulating bearing surface is configured for use with hip, elbow, knee or shoulder prostheses.

33. The method of claim 2, wherein the molding step is accomplished in an oxygen reduced atmosphere, and in which the irradiated powdered resin is maintained in a reduced oxygen atmosphere between said irradiation and said molding steps.

34. The method of claim 15, wherein the heating step is accomplished in an oxygen reduced atmosphere, and in which the irradiated powdered resin is maintained in a reduced oxygen atmosphere between said irradiation and said heating steps.

35. The method of claim 29, further comprising maintaining said reduced amount of oxygen between said irradiating step and said forming step and during said forming step.

36. The method of claim 2, wherein the irradiation step in an oxygen reduced atmosphere takes place in a sealed container, and further comprising the steps of flushing the sealed container with inert gas and evacuating said inert gas from the sealed container to reduce the residual oxygen content in the sealed container.

37. The method of claim 36, further comprising performing a post-irradiation pump down of the sealed container to remove residual hydrogen.

38. The method of claim 15, wherein the irradiation step in an oxygen reduced atmosphere takes place in a sealed container, and further comprising the steps of flushing the sealed container with inert gas and evacuating said inert gas from the sealed container to reduce the residual oxygen content in the sealed container.

39. The method of claim 38, further comprising performing a post-irradiation pump down to remove residual Hydrogen from the sealed container.

40. The method of claim 29, wherein said reducing an amount of oxygen in an ambient atmosphere around said particles during said irradiating takes place in a sealed container, and further comprising the steps of flushing the sealed container with inert gas and evacuating said inert gas from the sealed container to reduce the residual oxygen content in the sealed container.

41. The method of claim 40 further comprising performing a post-irradiation pump down to remove residual Hydrogen from the sealed container.

42. The method of claim 1 in which the irradiation step is at a level of 2 to 50 Mrads of gamma radiation.

43. The method of claim 1 in which the irradiation step is at a level of about 5 to 10 Mrads of gamma radiation.

44. The method of claim 14 in which the irradiation step is at a level of 2 to 50 Mrads gamma radiation.

45. The method of claim 14 in which the irradiation step is at a level of about 5 to 10 Mrads gamma radiation.

46. The method of claim 21, comprising irradiating said particles at a level of 2 to 100 Mrads gamma radiation.

47. The method of claim 21, comprising irradiating said particles at a level of 2 to 5 Mrads gamma radiation.

48. The method of claim 21, comprising irradiating said particles at a level of 2 to 20 Mrads gamma radiation.

49. The method of claim 21, comprising irradiating said particles at a level of 2 to 50 Mrads gamma radiation.

50. The method of claim 21, comprising irradiating said particles at a level of 5 to 10 Mrads gamma radiation.

\* \* \* \* \*